Dec. 29, 1959    R. W. CUMMING ET AL    2,918,869
GYROSCOPE DRIVING MEANS

Filed July 20, 1956    3 Sheets—Sheet 1

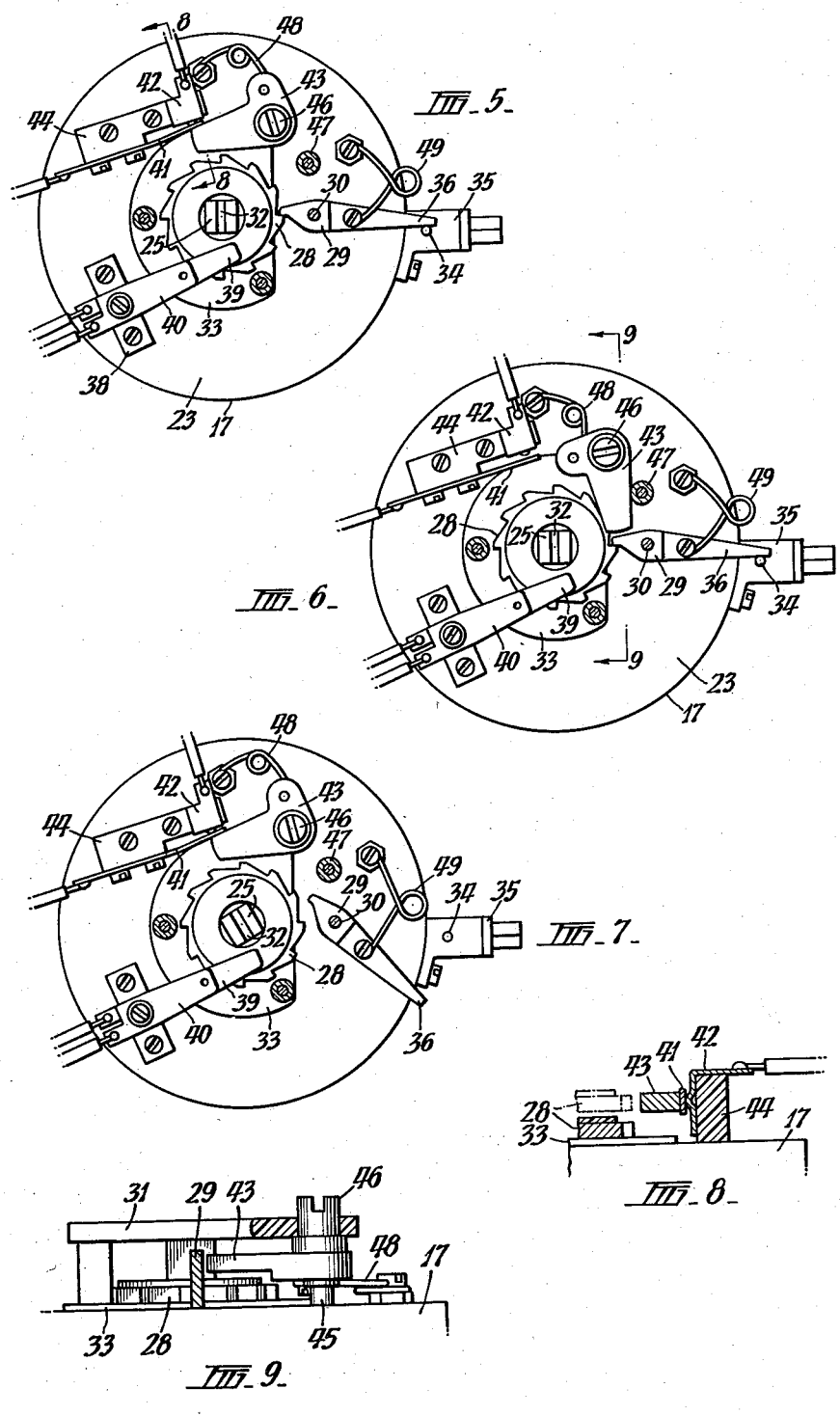

United States Patent Office 2,918,869
Patented Dec. 29, 1959

2,918,869
GYROSCOPE DRIVING MEANS

Ronald William Cumming, Brighton, Victoria, and Jack Raymond Green, Salisbury, South Australia, Australia, assignors to Commonwealth of Australia, Crown Solicitor's Office, Canberra, Australian Capital Territory, Commonwealth of Australia Application July 20, 1956, Serial No. 599,229

7 Claims. (Cl. 102—49)

This invention relates to gyroscope driving means and is concerned more particularly with driving means whereby a gyroscope rotor can be run up to speed and then allowed to coast. Gyroscopes having driving means of this nature have an important application in the field of short range guided missiles.

Driving means according to this invention are characterised in that they comprise a wound spring adapted to be coupled to the gyroscope rotor.

According to a feature of the invention the spring may comprise a clock spring adapted to be automatically uncoupled from the gyroscope rotor as it unwinds.

Another feature resides in the embodiment in a missile or the like of a gyroscope comprising driving means according to the invention.

According to other features of the invention a missile or the like embodying a gyroscope and spring driving means therefor may also embody safety testing means and/or firing means arranged to ensure that the gyroscope is run up to speed and the rotor uncaged before the missile is discharged.

The foregoing and other features of the invention will be explained in the following description of a preferred form thereof.

Figure 1:
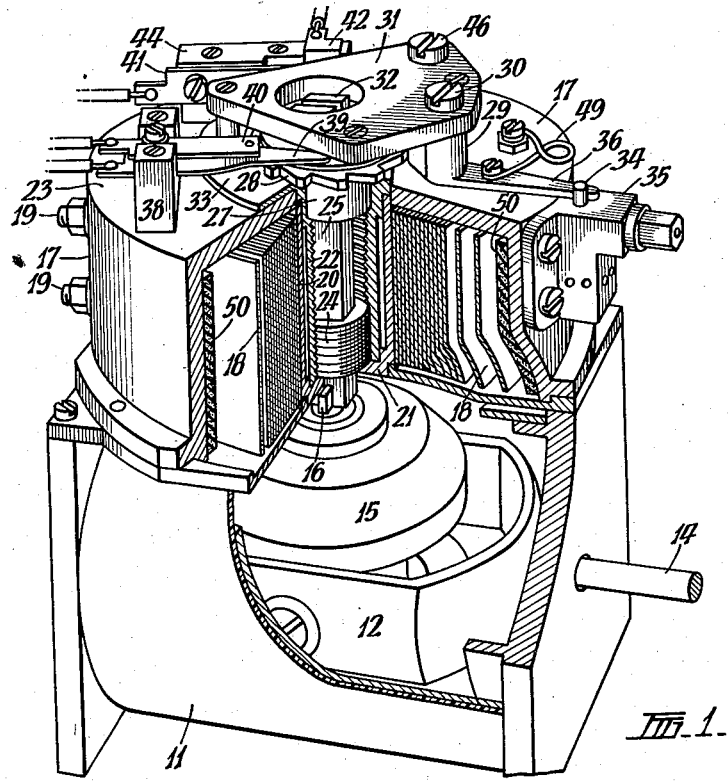
Figure 2:
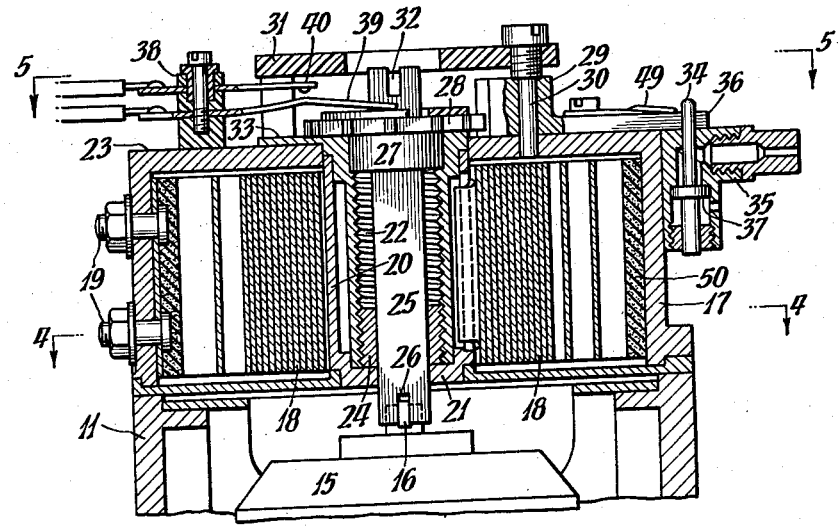
Figure 3:
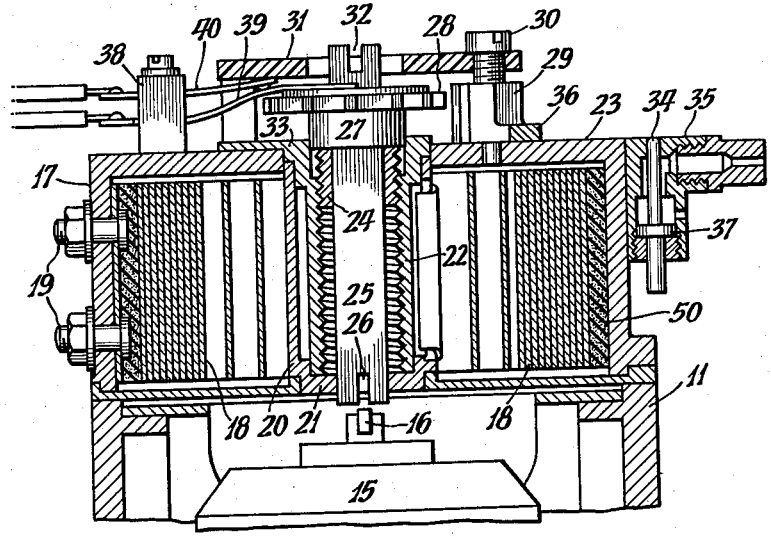
Figure 4:
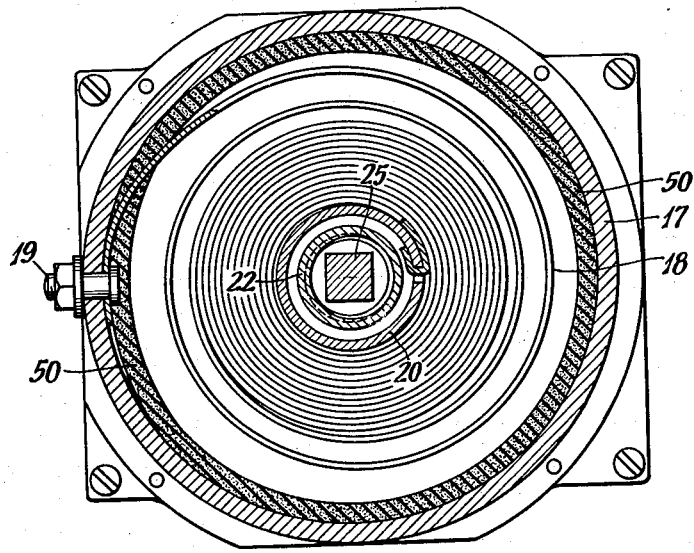

In this description reference is made to the accompanying drawings of which:

Figure 1 is a perspective view of a gyroscope and driving means therefor according to the invention, Figure 2 is a view in vertical cross-section of the driving means shown in Figure 1, with the spring fully wound, Figure 3 is a view similar to Figure 2 with the spring unwound, Figure 4 is a view in horizontal cross-section through the driving means, Figure 5 is a sectional plan view on the plane 5—5 of Figure 2, showing the gyroscope driving means ready for firing, Figure 6 is a view similar to Figure 5, showing the gyroscope driving means in "safe" condition, Figure 7 is a view similar to Figure 5 showing the gyroscope driving means after firing, Figure 8 is a view in section on the plane 8—8 of Figure 5, and Figure 9 is a view in section on the plane 9—9 of Figure 6.

In the drawings the same reference characters refer to like or corresponding parts.

The drawings illustrate a gyroscope suitable for a missile and having a cylindrical housing 11. The gyroscope which may be of the type disclosed in the specification of Australian patent application No. 10799/55, now Australian Patent No. 211,411, includes a gimbal ring 12 which is supported by shafting 14 coaxial with the housing 11, and a rotor 15 within the gimbal ring 12. A tongue 16 is provided on one end of the shaft 12, diametrical therewith, so as to form part of a dog clutch.

A second cylindrical housing 17 is fastened to the side of the housing 11 in such a position that the axis of the housing 17 is at right angles to the axis of the housing 11, and passes through the centre of the rotor 15 so that in one position of the latter (the position shown in the drawings) the axes of the housing 17 and rotor 15 are coincident. The housing 17 encloses a spirally wound spring, i.e. a clock spring, 18. The outer end of the spring 18 is attached by bolts 19 to the peripheral wall of the housing 17 and its inner end is securely connected to a cylindrical arbor 20 which is journalled axially in the housing 17. The arbor 20 has a cylindrical bore which is partly closed at the inner end, i.e. the lower end as seen in Figures 1 and 2, by an end wall 21 in which a square hole is formed.

A sleeve 22, which is internally screw-threaded and plane externally so as to be a running fit within the arbor 20, is inserted within the latter and fixed to the upper wall 23 of the housing 17. Inside the sleeve 22 there is provided a correspondingly externally threaded nut 24 having a square hole of the same size as that in the arbor end wall 21. A square shaft 25 is fitted through the square holes in the nut 24 and the arbor end wall 21. The inner, i.e. the lower, end of the shaft 25 is provided with a diametrically extending slot 26 which forms the other part of the dog clutch with the gyroscope rotor 15.

The outer end of the square shaft 25 extends upwardly through the boss 27 of a ratchet wheel 28, which is fixed to the shaft. The boss is engaged in an upper portion of the bore of the sleeve 22, which portion is not screw-threaded. The ratchet wheel 28 is engaged by a pawl 29 which is mounted on a pivot pin 30 disposed parallel to the axis of the shaft 25. The pivot pin passes downwardly through a top plate 31, which is supported parallel to the upper wall 23 of the housing 17, and into the wall 23.

The upper end of the shaft 25 has a slot 32 whereby the shaft can be turned. The spring 18 is wound by turning the shaft 25 which causes the arbor 20 to turn with it because of the engagement of the shaft through the square hole in the arbor end wall 21. When the spring is fully wound the arrangement is as shown in Figures 1, 2, 5 and 8, the nut 24 being at the lower or inner end of the sleeve 22, the ratchet wheel being in its lowermost position resting on a bearing plate 33 on the upper wall 23, and the parts 16 and 26 of the dog clutch being in engagement with each other. The spring is held in the fully wound condition by the engagement of the pawl with the ratchet. Upon release of the ratchet the spring unwinds, turning the arbor and the shaft and nut. The threads of the nut 24 and sleeve 22 are such that in this rotational movement the nut is screwed outwardly along the sleeve, and as the spring becomes fully unwound the nut bears against the inner face of the ratchet wheel boss 27 and moves the latter outwardly, i.e. in the upward direction of Figures 1 and 2, into the position shown in Figure 3, and in dotted lines in Figure 8. The shaft 25 is constrained to move with the ratchet wheel 28 so that as the latter rises it lifts the shaft out of engagement with the gyroscope rotor 15. The latter is accordingly uncaged as shown in Figure 3 and free to continue rotating.

The pawl 29 is moved in an anti-clockwise direction (as viewed in Figure 5) when the spring is being wound but it is also capable of moving in a clockwise direction from the position shown in Figure 5 so as to release the ratchet. This release movement of the pawl 29 is controlled by a release pin 34 which protrudes upwardly, from a body 35 fixed to the side of the spring housing 17, to engage a tail 36 on the pawl as shown in Figures 1, 2, 5 and 8. The pin 34 is disposed parallel to the axis of the shaft 25 and is provided with a piston 37 which is slidable in a cylindrical chamber within the body 35. The body 35 is constructed to receive a standard matchhead of the type used for igniting rockets. On firing the matchhead acts on the piston 37 and forces the pin 34 downwardly out of engagement with the pawl, as shown in Figure 3.

The wall 23 of the housing 17 supports a bracket 38 carrying two electrical contact arms 39 and 40 which overhang the ratchet wheel 28. The contacts of these arms are open when the ratchet is in its lower position, but at the end of the upward movement of the ratchet, and after the gyroscope has been uncaged the lower contact arm 39 is moved upwardly by the ratchet into engagement with the upper arm 40 thereby closing the contacts. These contacts are connected in series with the firing circuit for the rocket motors of the missile with which the governor and driving means are used, so that the arrangement automatically fires the missile immediately after the gyroscope rotor has been run up to speed and uncaged.

The equipment also includes another pair of contact arms 41 and 42 which are normally open, and are in series with the matchhead igniting circuit, and a lever 43 movable manually to close the contacts of the arms 41 and 42. These contacts are mounted on a bracket 44 fixed to the wall 23, and the lever 43 is fixed on a pin 45 which is parallel to the axis of the shaft 25 and journalled in the wall 23 and the top plate 31. The pin 45 has a head 46 which is slotted to enable it to be turned. The lever 43 is constrained to move with the pin 45 and is movable through an angle of about 90° between the position shown in Figure 5 wherein it holds the contact arms 41 and 42 with their contacts closed, and the position shown in Figure 6 in which it engages a fixed stop 47. An over-centre spring 48 is provided to hold the lever 43 in either of these extreme positions. In the position of the lever shown in Figure 6, the contacts 41 and 42 are open and the distal end of the lever 43 is located near the tip of the pawl in a position to prevent the latter from moving to release the ratchet. When the lever is in the position shown in Figure 6 the mechanism is in a safe condition because operation of the external firing means will not close the circuit to the matchhead as the contacts 41 and 42 are open.

A special limited-torque key (not shown) is provided to move the lever 43 between the positions shown in Figures 5 and 6. The arrangement is such that if the gyroscope and driving means are in readiness for firing, the limited torque key can overcome the resistance of the over-centre spring 48 and move the lever between the "fire" position of Figure 5 and the "safe" position of Figure 6.

If the lever 43 is in the safe position but the tail of the pawl is not engaged by the release pin 34, the pawl 29 is forced by a further spring 49 into engagement with the tip of the lever 43. This engagement prevents the ratchet from being released and it also imposes considerable frictional resistance against rotation of the lever 43 so that the latter cannot be turned by the limited torque key. Hence the mechanism cannot be moved from the "safe" to the "fire" position unless the pawl is safely engaged by the release pin.

The ratchet wheel may be in its upper position so that the contacts 39 and 40 are closed, either because the gyroscope has been released prematurely, or because the ratchet wheel 28 and shaft 25 have not been held down properly during winding up. If this is so, it will be impossible for the lever 43 to pass between the ratchet wheel and the top plate 31, as shown by Figure 8, and this will be detected as soon as an attempt is made to move the lever 43 with the limited-torque key.

With a view to reducing the shock which occurs when the fully unwound spring strikes the wall of the housing 17, the latter is lined with sponge rubber 50.

By altering the length, width, or thickness of the spring 18 while keeping its mass constant, the acceleration time for the rotor could be varied within wide limits. Variation of the acceleration time can also be achieved by employing a gear drive between the spring and the rotor.

The device is set ready for operation by turning the shaft 25 in the clockwise direction as shown in Figure 5. The arbor 20 turns with the shaft causing the spring 18 to become wound and at the same time, the nut 24 is screwed downwardly within the sleeve 22 thereby permitting the shaft to move downwardly and the parts 16 and 26 of the dog clutch to engage each other. When the spring is fully wound the nut is at the bottom of its travel and the ratchet wheel 28 is in its lowermost position resting on the bearing plate 33. The spring is held in the fully wound condition by the engagement of the ratchet wheel 28 by the pawl 29 which is in turn held by the pin 34. The device is rendered safe by turning the lever 43 into the position shown in Figure 6, in which position the pawl 29 is prevented from moving to release the ratchet wheel 28 even if the pin 34 is released.

When the device is assembled in a missile it is made ready for firing by turning the lever 43 with the limited torque key, and it is fired by firing a match-head to withdraw the pin 34. On withdrawal of the pin 34 the pawl 29 moves allowing the ratchet wheel 28 to turn, and the spring to unwind. As the spring unwinds, the arbor 20, shaft 25 and nut 24 are all rotated in an anti-clockwise direction as shown in Figure 7, with very great acceleration so that by the time the spring is almost fully unwound they are rotating at a high speed. At this stage the gyroscope rotor is also rotating at the same speed since it is connected to the shaft 25 by the dog clutch. In the final stage of unwinding the nut 24 engages against the inner face of the ratchet wheel boss 27 and lifts the shaft out of engagement with the rotor. The rotor thereupon continues to rotate and is uncaged. Almost immediately after the rotor becomes uncaged the ratchet wheel closes the contacts 39 and 40 thereby closing the firing circuit for the rocket motors of the missile. Thus the missile is fired immediately after the gyroscope has been run up to speed and uncaged.

We claim:

1. Gyroscope rotor driving means comprising a housing, a clock spring in said housing, a spindle coupled to said clock spring, means mounting said spindle for movement longitudinally of itself, means coupling said spindle to said gyroscope rotor when said spindle occupies a position closest to said rotor, and means actuated by the unwinding of said spring first for rotating said coupled spindle and rotor and thereafter moving said spindle away from said rotor and uncoupling said spindle from said rotor.

2. Gyroscope driving means as defined in claim 1 and which further includes a pair of contacts supported by said housing and actuated to a closed position by movement of said spindle away from said rotor.

3. Gyroscope rotor driving means comprising a housing, a clock spring fixed by its outer end to the wall of the housing, a sleeve fixed in the centre of the housing, an arbor rotatably mounted on the sleeve and fixed to the opposite end of the clock spring, a shaft extending through the sleeve and constrained to rotate with the arbor, a clutch dog on the spindle for engaging a corresponding dog on the gyroscope rotor, a nut slidably and non-rotatably mounted on the shaft within the sleeve, said nut being in screw-threaded engagement with the sleeve, and an abutment fixed on the shaft for engagement by the nut.

4. Gyroscope rotor driving means comprising a housing, a clock spring fixed by its outer end to the wall of the housing, a sleeve fixed in the centre of the housing, an arbor rotatably mounted on the sleeve and fixed to the opposite end of the clock spring, a shaft extending through the sleeve and constrained to rotate with the arbor, a clutch dog on the spindle for engaging a corresponding dog on the gyroscope rotor, a nut slidably and non-rotatably mounted on the shaft within the sleeve, said nut being in screw-threaded engagement with the sleeve, a ratchet wheel fixed on the shaft, a pawl for engagement with the ratchet wheel, a release pin for preventing disengaging movement of the pawl, means for retracting said release pin, and normally open contacts disposed to be contacted and closed by the ratchet wheel when the shaft is moved and disengages the clutch.

5. Gyroscope rotor driving means according to claim 4 including a further pair of contacts and a stop, a lever movable between one position in which it engages said contacts and another position in which it engages said stop and bars disengaging movement of the pawl, and an over-centre spring biasing said lever to either of said positions.

6. In or for a missile, a gyroscope including a rotor, a housing, a clock spring in said housing having its outer end fixed to the peripheral wall thereof, a sleeve fixed centrally in said housing, an arbor rotatable on said sleeve and fixed to the inner end of the clock spring, a shaft extending through the sleeve and constrained to rotate with the arbor, a clutch dog on the shaft, a mating clutch dog on the gyroscope rotor, a nut slidably and non-rotatably mounted on the shaft in screw-threaded engagement with the sleeve, a ratchet wheel fixed on the shaft, a pawl for engagement with the ratchet wheel, a body mounted on the housing, a release pin in said body for preventing movement of the pawl out of engagement with the ratchet, and contacts connected in series with a circuit for firing the driving means of the missile, said contacts being normally open and positioned to be closed by engagement by the ratchet when the latter is moved away from the gyroscope.

7. The combination according to claim 6 including a second pair of contacts which are normally open, a stop, and a lever movable between one position in which it engages and closes the second pair of contacts and another position in which it engages the stop, said lever being so located in said other position as to prevent movement of the pawl to disengage the ratchet, said body being adapted to receive a matchhead and to move said release pin out of engagement with the pawl on firing of said matchhead, said second pair of contacts being connected in series in a firing circuit for said matchhead, and an over-centre spring for biasing the lever to either of said positions.

References Cited in the file of this patent
UNITED STATES PATENTS
2,732,721   Summers _____ Jan. 31, 1956